United States Patent
Sohda et al.

[11] Patent Number: 5,114,635
[45] Date of Patent: May 19, 1992

[54] PROCESS FOR PRODUCING CARBON MATERIAL AND CARBON/CARBON COMPOSITES

[75] Inventors: Yoshio Sohda, Kawasaki; Yasuzi Ido, Yokohama; Toshinori Nakamura; Takeshi Suemitsu, both of Kobe, all of Japan

[73] Assignees: Kawasaki Heavy Industries, Ltd., Hyogo; Nippon Oil Company, Limited, Tokyo, both of Japan

[21] Appl. No.: 291,007

[22] Filed: Dec. 28, 1988

[30] Foreign Application Priority Data

Dec. 28, 1987 [JP] Japan ................. 62-330018
Mar. 18, 1988 [JP] Japan ................. 63-63172
Nov. 10, 1988 [JP] Japan ................. 63-282387

[51] Int. Cl.$^5$ ............................. C01B 31/00
[52] U.S. Cl. ..................... 264/29.2; 264/29.1; 264/29.5; 264/500; 264/510
[58] Field of Search ........... 264/570, 29.2, 29.5, 264/29.1, 500, 510

[56] References Cited

U.S. PATENT DOCUMENTS

| | | | |
|---|---|---|---|
| 484,184 | 10/1892 | Edison | 264/570 |
| 3,931,382 | 1/1976 | Witkin | 264/570 |
| 4,226,900 | 10/1980 | Carlson et al. | 427/227 |
| 4,554,024 | 1/1985 | Zimmer et al. | 427/227 |
| 4,744,943 | 5/1988 | Timm | 264/56 |
| 4,776,994 | 10/1988 | Nelson et al. | 264/570 |
| 4,776,995 | 10/1988 | Nelson et al. | 264/570 |
| 4,847,021 | 7/1989 | Montgomery | 264/29.6 |

FOREIGN PATENT DOCUMENTS 2143170  2/1985  United Kingdom ........ 264/570

*Primary Examiner*—Hubert C. Lorin
*Attorney, Agent, or Firm*—Scully, Scott, Murphy & Presser

[57] ABSTRACT

A carbon/carbon composites is produced by impregnating a tow of carbon filaments with a carbonaceous pitch, placing the impregnated tow in an open container, then subjecting it to a heat treatment under hot isostatic pressing.

10 Claims, No Drawings

PROCESS FOR PRODUCING CARBON MATERIAL AND CARBON/CARBON COMPOSITES

BACKGROUND OF THE INVENTION

The present invention relates to a process for producing a carbon material and a carbon/carbon composites.

Carbonaceous pitch is used as a starting material for a high-density carbon material because of a high carbonization yield thereof. However, it involves the problem of bubble formation and crack formation caused by the evolution of decomposition gas during carbonization. As a method for solving this problem there is used hot isostatic pressing (hereinafter referred to sometimes as "HIP"). But the gas evolved during carbonization will contaminate intra-furnace components such as a heater and heat insulating material, and as the case may be the HIP system may be damaged. To avoid this, in HIP for the production of carbon material, there is performed what is called canning wherein a feed material is placed in a sealed type container such as one made of glass or stainless steel. The container also serves to maintain the shape of a product being heat-treated. On the other hand, a carbon/carbon composites has unique properties such as maintaining high strength and high elasticity even at high temperatures above 1,000° C. and small thermal expansion and its application to components of airospace-craft and devices, brakes, furnace materials, etc. Due to the aforesaid characteristics, carbonaceous pitch is also used as a matrix precursor for a carbon/carbon composites, and in the carbonization step of this manufacturing process there is used HIP wherein what is called canning is performed, that is, feed materials a charged into a glass or stainless steel container.

Where a closed type container is used, however, a canning step such as vacuum sealing is needed for imparting a sealing function to the container. Further, removal of the container and re-canning are necessary at the time of re-impregnation for densifying. As a result, the manufacturing process becomes complicated and the treated product may be cracked due to the internal pressure of the gas evolved or a carbon fiber fabric may be deformed due to the pressure of the container during production of a carbon/carbon composites.

SUMMARY OF THE INVENTION

It is an object of the present invention to overcome the above-mentioned drawbacks of the prior art.

It is another object of the present invention to provide a process for producing a carbon material and a carbon/carbon composites both of high performance in a simple manner.

In one aspect, the present invention resides in a process for producing a carbon material wherein carbonaceous pitch is placed in an open container, heat-treated under hot isostatic pressing, and if necessary, carbonized or graphitized.

In another aspect, the present invention resides in a process for producing a carbon/carbon composites wherein a perform of carbon filaments is impregnated with carbonaceous pitch, then thus-impregnated tow is placed in an open container, heat-treated under hot isostatic pressing, and if necessary, carbonized or graphitized.

DETAILED DESCRIPTION OF THE INVENTION

The process for producing a carbon materials and a carbon/carbon composites according to the present invention will be described in detail hereinunder.

The "carbonaceous pitch" as referred to herein indicates a coal- or petroleum-based pitch having a softening point in the range of 100° to 400° C., preferably 150° to 350° C. Both optically isotropic and anisotropic pitches are employable, but an optically anisotropic pitch having an optically anisotropic phase content of 60–100 vol% is particularly preferable.

The "open container" is a container not having a sealing function. The material of the container may be suitably selected from, for example, metals such as aluminum, soft steel and stainless steel, glass, graphite and ceramics according to temperatures used or purposes of use. The shape of the container is not specially limited if only the container is an open type. It is optional whether the container is to be covered or uncovered. For example, the product to be treated may be merely wrapped in a metallic foil.

Having made studies, we found that in heat-treating the carbonaceous pitch by hot isostatic pressing, the shape of the product being treated could be retained even without using a closed container, and that cracking of the product being treated ascribable to the internal pressure of the gas evolved could be prevented by using an open container. The open container may be charged with a material capable of collecting the reaction product gas physically or chemically.

The foregoing objects of the present invention can be fully attained by using an open container, but it is desirable to use an HIP system equipped with an exhaust mechanism particularly where the amount of the product to be treated is large. The HIP system with an exhaust mechanism is provided with a mechanism capable of exhausting gases evolved from the product being treated during HIP, continuously under control. More particularly, the exhaust mechanism can adjust the amount of the gas to be removed in accordance with the amount and/or diffusion rate of the gas evolved. The gas exhaust mechanism comprises a heat exchanger for heat exchange with the pressure medium gas in the furnace as well as a cooler, a pressure reducing device and a flow control valve which are disposed in the exterior of the furnace. It is also an outstanding characteristic of the HIP system with an exhaust mechanism that the operation can be done while analyzing the gas evolved during heat treatment. According to our studies, it is desirable that the heat treatment be conducted until $C_2$ or higher gases are substantially no longer evolved. The "substantially no longer evolved" means that the concentration of such evolved gases in the exhaust gases becomes not higher than 10 ppm, preferably not higher than 5 ppm.

The heat treatment under pressure in the HIP system can be conducted at a temperature in the range of 100° to 3,000° C., preferably 400° to 2,000° C., and at a pressure of an inert gas in the range of 50 to 10,000 kg/cm², preferably 200 to 2,000 kg/cm². As the pressure medium gas there may be used an inert gas such as, for example, argon, nitrogen or helium.

It is desirable to perform the heat treatment while controlling the temperature profile or both the temperature profile and the exhaust rate so that the rate of evolution of $H_2$ nd that of $CH_4$ in the exhaust gases do not exceed 10 mol/hr, preferably 5.0 mol/hr, more preferably 2.0 mol/hr, most preferably 1.0 mol/hr, per 100 grams of the starting carbonaceous pitch.

For example, the heat-up rate is 40° C./min or less, preferably 20° C./min or less, up to 400° C., 50° C./min or less, preferably 25° C./min or less, up to 800° C., 40° C./min, preferably 20° C./min, up to 1,000° C. The exhaust rate is determined according to the amount of pitch used, but it is preferable that the heat treatment be carried out under hot isostatic pressing while exhausting gases at a rate of 0.05 to 10 Nm$^3$/hr.

According to a more preferable treating process in the present invention, the carbonaceous pitch is placed in an open container and heat-treated under hot isostatic pressing in an HIP system with an exhaust mechanism in conditions in which the $H_2/CH_4$ mole ratio in the gases evolved does not exceed 500, preferably 200, most preferably 100. An $H_2/CH_4$ mole ratio exceeding 500 during heat-up is not desirable because contaminants such as deposits would be produced within the furnace.

As stated above, it is desirable that a collector material for collecting the reaction product gas physically or chemically be present in the open container. As examples of such collector material, refractory fibers, iron and iron alloys are particularly preferred.

As refractory fibers there may be used, for example, filaments, staple fibers and felts of carbon, oxide ceramics and non-oxide ceramics. As concrete examples, staple fibers of carbon, silica, alumina, and mixtures thereof are preferred.

As iron there is used iron having a purity not lower than 99%.

Preferred examples of iron alloys are alloys of iron and not more than 10% of one or more metals selected from nickel, chromium, molybdenum, vanadium, tungsten, silica and manganese.

Iron and iron alloys may be used in the form of powder, fine wire, mesh, or a porous formed body.

The mode of use of the collector material is not specially limited. For example, there may be adopted a method wherein the product to be treated is placed in an open container and the collector material is placed thereabove, a method wherein the product to be treated is wrapped in metallic foil and the foil is then wrapped in felt of the collector material, or a method wherein the product to be treated and the collector material are wrapped together in metallic foil. Further, for preventing the collector material from entering the product to be treated, a metallic foil or the like may be placed between the two.

Two or more of refractory fibers, iron and iron alloys may be used together. In this case, they may be used, for example, in the form of a mixture or a laminate. The amount of at least one kind of material selected from refractory fibers, iron and iron alloys is determined according to treating conditions, but usually refractory fibers and iron, iron alloys are used in amounts of 10-1,000, parts by weight, respectively, based on 100 parts by weight of the product to be treated. A collector material for hydrogen such as for example, titanium, zirconium or magnesium may also be present.

According to the process of the present invention, a carbon/carbon composites is produced by impregnating a tow of carbon filaments with the carbonaceous pitch, heat-treating the impregnated tow under pressure under the conditions described above in an HIP system, preferably an HIP system with an exhaust mechanism, and if necessary, carbonizing or graphitizing the so-treated tow. As the carbon fibers there may be used any of pitch-, polyacrylonitrile- and rayon-based carbon fibers, with pitch-based carbon fibers being preferred. The "tow of carbon filaments" indicates a product obtained by forming a bundle of 500 to 100,000 carbon filaments each 5-100 μm in diameter into shape in two or three dimensions such as, for example, a unidirectional laminate, a two-dimensional fabric or a laminate thereof, a three-dimensional fabric, or a product formed in the shape of mat or felt.

The "pitch-based carbon fiber" as referred to herein indicates a fiber obtained by melt-spinning a carbonaceous pitch followed by infusibilization and carbonization and, if necessary, graphitization. As the carbonaceous pitch for the production of the pitch-based carbon fiber there is used a coal- or petroleum-based pitch having a softening point of 100°–40° C., preferably 150°–350° C. Both optically isotropic and anisotropic pitches are employable, but an optically anisotropic pitch having an optically anisotropic phase; content of 60 to 100% is particularly preferred.

The carbonaceous pitch is melt-spun into a pitch fiber in a known manner, which pitch fiber is then rendered infusible in an oxidative gas atmosphere at a temperature in the range of 50° to 400° C., preferably 100° to 350° C. As the oxidative gas there may be used air, oxygen, nitrogen oxide, sulfur oxide, halogen, or a mixture thereof.

The pitch fiber thus rendered infusible is then subjected to a carbonization treatment in an inert gas atmosphere at a temperature of 800° to 2,000° C., and if necessary, further subjected to a graphitization treatment at 2,000° to 3,000° C., to obtain carbon fiber.

In the present invention, as previously noted, a tow of the carbon filaments thus obtained is impregnated with the carbonaceous pitch and the impregnated tow is heat-treated under pressure. The impregnation can be effected by heat-melting the carbonaceous pitch in vacuum and/or under pressure. The viscosity in the impregnation may be lowered by cut-bark using a solvent. Examples of the solvent include aromatic hydrocarbons, pyridine and quinoline. Further, the impregration-HIP treatment cycle may be repeated as required for densifying.

The volume fraction of the carbon fiber in the composite material is determined according to purposes, but usually it is in the range of 5 to 70%.

The product which has been heat-treated under pressure in the HIP system is further subjected to a carbonization or graphitization treatment as necessary. The carbonization and graphitization treatments are carried out each in an inert gas atmosphere at 800°–2,000° C. and 2,000°–3,000° C., respectively, in a known manner.

The following examples are given to illustrate the present invention more concretely, but the invention is not limited thereto.

EXAMPLE 1

An optically anisotropic pitch having a softening point of 280° C. was placed in an open container made of quartz and a ceramic fiber felt was placed thereabove. Then, in an HIP system, a carbonization treatment was carried out at 800° C. under a pressure of 1,000 kg/cm$^2$ using argon gas. The resultant carbonized product was by no means inferior to a carbonized product which had been subjected to an HIP treatment in a closed container.

EXAMPLE 2

An optically anisotropic pitch having a softening point of 280° C. was wrapped in stainless steel foil and then subjected to a carbonization treatment at 800° C. under an argon gas pressure of 1,000 kg/cm² in an HIP system with an exhaust mechanism. The resultant carbonized product was little cracked.

COMPARATIVE EXAMPLE 1

The same pitch as that used in Example 2 was vacuum-sealed into a stainless steel container and then a carbonization treatment was performed at 1,000° C. under an argon gas pressure of 1,000 kg/cm² in an HIP system. Many cracks were found in the resultant carbonized product.

EXAMPLE 3

A laminate of two-dimensional fabrics (plain weave) using the bundle of 3,000 pitch-based carbon filaments with 10 μm diameter was impregnated with an optically anisotropic pitch having a softening point of 280° C. The thus-impregnated laminate was wrapped in aluminum foil and then subjected to a carbonization treatment at 550° C. at a nitrogen gas pressure of 1,000 kg/c², under exhaust at a rate of 1,000 Nm³/hr in an HIP system. The carbonized laminate was then subjected to a graphitization treatment in an inert gas atmosphere at 2,500° C. under atmospheric pressure. The resultant carbon/carbon composites was inspected using a scanning electron microscope and a polarizing microscope to find that the matrix was well filled into the interior of bundles and also between the bundles and the carbon fiber fabrics were not deformed.

COMPARATIVE EXAMPLE 2

The same impregnated laminate as that used in Example 3 was vacuum-sealed into a stainless steel container and then treated in an HIP system under the same conditions as in Example 3. As a result, the carbon fiber fabrics were deformed due to the pressure of the container.

EXAMPLE 4

A three-dimensional cross-fabric using the bundle of 3,000 pitch-based carbon filaments with 10 μm diameter was impregnated with an optically anisotropic pitch having a softening point of 280° C. The thus-impregnated fabric was wrapped in stainless steel foil and then subjected to a carbonization treatment at 800° C. under a nitrogen gas pressure of 1,000 kg/cm² in an HIP system with an exhaust mechanism, followed by a graphitization treatment in an inert gas atmosphere at 2,500° C. under atmospheric pressure. The resultant composite carbon/carbon material was observed using a scanning electron microscope and a polarizing microscope to find that the matrix was well filled into the interior of bundles and also between the bundles the carbon fiber fabric was not deformed.

COMPARATIVE EXAMPLE 3

The same impregnated products as in Example 4 was vacuum-sealed into a stainless steel container and treated in an HIP system under the same conditions as in Example 4. As a result, the carbon fiber fabric was deformed due to the pressure of the container.

EXAMPLE 5

A three-dimensional fabric using the bundle of 2,000 pitch-based carbon filaments with 10 μm diameter was impregnated with an optically anisotropic pitch having a softening point of 280° C. and the thus-impregnated fabric was subjected to a carbonization treatment at 550° C. under a nitrogen gas pressure of 1,000 kg/cm² in an HIP system with an exhaust mechanism. This carbonization under pressing was followed by a carbonization treatment in an inert gas atmosphere at 1,700° C. under atmospheric pressure. The thus-treated product was again impregnated with the optically anisotropic pitch having a softening point of 280° C. and then carbonized under pressing in the HIP system with an exhaust mechanism under the above conditions. This cycle was repeated five times. The resultant composite carbon/carbon material had a bulk density of 1.74 and a bending strength of 35 kgf/mm².

EXAMPLE 6

An optically anisotropic pitch having a softening point of 280° C. was wrapped in stainless steel foil and then carbonized under an argon gas pressure of 1,000 kg/cm² at heat-up rates of 0.5° C./min up to 400° C. and 2° C./min up to 1,000° C. in an HIP system. Maximum evolution rates of $H_2$ and $CH_4$ in evolved gases were 0.58 mol/hr and 0.96 mol/hr, respectively, per 100 grams of the starting carbonaceous pitch. The resultant carbonized product was little cracked. After the operation, the system was opened and checked to find that the furnace interior was contaminated only to a slight extent.

COMPARATIVE EXAMPLE 4

The same pitch as that used in Example 5 was vacuum-sealed into a stainless steel container and then carbonized at 1,000° C. under an argon gas pressure of 1,000 kg/cm² in an HIP system. As a result, many cracks were found in the carbonized product obtained.

EXAMPLE 7

An optically anisotropic pitch having a softening point of 280° C. was placed in an open container made of quartz and a ceramic fiber felt was placed thereabove. Then in an HIP system with an exhaust mechanism, a carbonization treatment was carried out under an argon gas pressure of 1,900 kg/cm² at heating rates of 0.5° C./min up to 550° C. and 5° C./min up to 1,000° C. The gas exhaust rate was set at 1,0 Nm³/hr. Maximum evolution rates of $H_2$ and $CH_4$ in exhaust gases were 0.72 mol/hr and 1.24 mol/hr, respectively, per 100 grams of the starting carbonaceous pitch. The resultant carbonized product had a dense texture and was little cracked. After the operation, the system was opened and inspected to find that the furnace interior was contaminated only to an extremely slight extent.

EXAMPLE 8

A laminate of two-dimensional fabrics (plain weave) using the bundle of 2,000 pitch-based carbon filaments with 10 μm diameter was impregnated with an optically anisotropic pitch having a softening point of 280° C. The thus-impregnated laminate was wrapped in aluminum foil and then carbonized under an argon gas pressure of 1,000 kg/cm² at heating rates of 0.5° C./min up to 400° C. and 2° C./min up to 1,000° C. while gas exhaust rate was made at 5 Nm³/hr. Maximum evolution rates of $H_2$ and $CH_4$ in evolved gases were 0.58 mol/hr and 0.96 mol/hr, respectively, per 100 grams of the starting carbonaceous pitch. The resultant carbon/carbon composites was observed using a scanning electron microscope and a polarizing microscope to find that the matrix was well filled into the interior of bundles and also between the bundles and there were few cracks. Besides, the carbon fiber fabrics were not deformed. After the operation, the system was opened and inspected to find that the furnace interior was contaminated only to an extremely slight extent.

COMPARATIVE EXAMPLE 5

The same impregnated product as that used in Example 8 was vacuum-sealed into a stainless steel container and treated in an HIP system under the same conditions as in Example 8. As a result, the carbon fiber fabrics were deformed due to the pressure of the container.

EXAMPLE 9

A three-dimensional orthogonal fabric using the bundle of 2,000 pitch-based carbon filaments with 10 μm diameter was impregnated with an optically anisotropic pitch having a softening point of 280° C. The thus-impregnated fabric was wrapped in stainless steel foil and then carbonized under a nitrogen gas pressure of 1,000 kg/cm² at heating rates of 0.5° C./min up to 400° C. and 2° C./min up to 1,000° C. while gas exhaust was made at a rate of 1.5 Nm³/hr in an HIP system with an exhaust mechanism. Maximum evolution rates of $H_2$ and $CH_4$ in exhaust gases were 0.58 mol/hr and 0.96 mol/hr, respectively, per 100 grams of the starting carbonaceous pitch. The resultant carbon/carbon composite was inspected using a scanning electron microscope and a polarizing microscope to find that the matrix was well filled into the interior of bundles and also between the fibers and the carbon fiber fabric was not deformed. Besides, the composite material had a dense texture and few cracks. After the operation, the system was opened and inspected to find that the furnace interior was contaminated only to an extremely slight extent.

COMPARATIVE EXAMPLE 6

The same impregnated fabric as that used in Example 9 was vacuum-sealed into a stainless steel container and then treated in an HIP system under the same temperature and pressure conditions as in Example 9. As a result, the carbon fiber fabric was deformed by the pressure of the container and had many cracks.

EXAMPLE 10

A three-dimensional orthogonal-fabric using the bundle of 2,000 pitch-based carbon filaments with 10 μm diameter was impregnated with an optically anisotropic pitch having a softening point of 280° C. The thus-impregnated fabric was wrapped in stainless steel foil and then carbonized under a nitrogen gas pressure of 1,000 kg/cm² at heating rates of 0.5° C./min up to 400° C., 2° C./min up to 800° C. and 5° C./min up to 1,000° C. while gas exhaust was made at a rate of 1 Nm³/hr in an HIP system with an exhaust mechanism. Evolution rates of $H_2$ and $CH_4$ in exhaust gases were 0.54 mol/hr and 0.46 mol/hr, respectively, per 100 grams of the carbonaceous pitch. The resultant carbon/carbon composites was observed using a scanning microscope and a polarizing microscope to find that the matrix was well filled into the interior of bundles and also between the bundles and that the composite material had a denser texture than in Example 4 and few cracks. Besides, the carbon fiber fabric was not deformed. After the operation, the system was opened and inspected to find that the furnace interior was contaminated only to an extremely slight extent.

EXAMPLE 11

A petroleum pitch having a softening point of 280° C. and an optically anisotropic phase content of 100 vol% was placed in an open container made of quartz and staple ceramic fibers consisting of 50 wt% alumina and 50 wt% silica were placed thereabove in an amount of 100 parts by weight based on 100 parts by weight of the pitch, then in an HIP system there was performed a carbonization treatment at 800° C. under an argon gas pressure of 1,000 kg/cm². The resultant carbonized product was by no means inferior to a carbonized product which had been subjected to HIP treatment in a closed container. The furnace interior was contaminated only to an extremely slight extent.

EXAMPLE 12

The petroleum pitch used in Example 11 was wrapped in stainless steel foil and an iron powder having a purity of 99% and a particle diameter of 5 μ was charged outside the foil in an amount of 1,000 parts by weight based on 100 parts by weight of the pitch, then a carbonization treatment was performed at 800° C. under an argon gas pressure of 1,000 kg/cm². The resultant carbonized product was little cracked. The furnace interior was contaminated only to an extremely slight extent.

EXAMPLE 13

A petroleum pitch having a softening point of 280° C. and an optically anisotropic phase content of 90 vol% was wrapped in aluminum foil and a ceramic fiber felt consisting of 50 wt% alumina and 50 wt% silica was placed outside the foil in an amount of 200 parts by weight based on 100 parts by weight of the pitch, then a carbonization treatment was performed at 550° C. under an argon gas pressure of 1,000 kg/cm². The resultant carbonized product was little cracked and the furnace interior was contaminated only to an extremely slight extent.

EXAMPLE 14

The petroleum pitch used in Example 11 was placed in an alumina container and a ceramic fiber felt consisting of 50 wt% alumina and 50 wt% silica, a low carbon steel wool and the said ceramic fiber felt were placed above the petroleum pitch in three layers in amounts of 100, 300 and 25 parts by weight, respectively, based on 100 parts by weight of the pitch, then in an HIP system with an exhaust mechanism there was performed a carbonization treatment at 800° C. under an argon gas pressure of 1,000 kg/cm². The resultant carbonized product was little cracked and the furnace interior was contaminated only to an extremely slight extent.

EXAMPLE 15 a laminate of two-dimensional fabrics (plain weave) using the bundle of 3,000 pitch-based carbon filaments with 10 μm diameter was impregnated with the pitch used in Example 11. The thus-impregnated laminate was wrapped in aluminum foil and a ceramic fiber felt consisting of 50 wt% alumina and 50 wt% silica was placed outside the foil in an amount of 100 parts by weight based on 100 parts by weight of the pitch, then in an HIP system there was conducted a carbonization treatment at 550° C. under a nitrogen gas pressure of 1,000 kg/cm² while exhaust was made at a rate of 2 Nm³/hr. The carbonized product was then subjected to a graphitization treatment in an inert gas atmosphere at 2,500° C. under atmospheric pressure. The resultant carbon/carbon composites was observed using a scanning electron microscope and a polarizing microscope to find that the matrix was well filled into the interior of bundles and also between the bundles. The carbon fiber fabrics were not deformed and the furnace interior was contaminated onto to an extremely slight extent.

EXAMPLE 16

A three-dimensional orthogonal-fabric using the bundles of 3,000 pitch-based carbon filaments with 10 μm diameter was impregnated with the petroleum pitch used in Example 11. The impregnated fabric was wrapped in stainless steel foil and a ceramic fiber felt consisting of 50 wt% alumina and 50 wt% silica was placed thereabove in an amount of 300 parts by weight based on 100 parts by weight of the pitch. Then, in an HIP system with an exhaust mechanism there was conducted a carbonization treatment at 800° C. under a nitrogen gas pressure of 1,000 kg/cm², followed by a graphitization treatment in an inert gas atmosphere at 2,500° C. under atmospheric pressure. The resultant carbon/carbon composite was observed using a scanning electron microscope and a polarizing microscope to find that the matrix was well filled into the interior of bundles and also between the bundles. The carbon fiber fabric was not deformed and the furnace interior was contaminated only to an extremely slight extent.

EXAMPLE 17

A three-dimensional fabric using the bundle of 2,000 pitch-based carbon filaments with 10 μm diameter was impregnated with the petroleum pitch used in Example 11 and an iron powder having a purity of 99% and a particle diameter of 5 μ was placed outside the impregnated fabric. Then, in an HIP system with an exhaust mechanism there was conducted a carbonization treatment at 1,000° C. under a nitrogen gas pressure of 1,000 kg/cm², followed by a carbonization treatment in an inert gas atmosphere at 1,700° C. under atmospheric pressure. The thus-carbonized product was again impregnated with the petroleum pitch and then carbonized under the above conditions in the HIP system with an exhaust mechanism. This cycle was repeated five times. The resultant composite carbon/carbon material had a bulk density of 1.74 and a bending strength of 35 kg/mm².

What is claimed is:

1. A process for producing a carbon material, which comprises placing a carbonaceous pitch in an open container, subjecting the pitch to a heat treatment under hot isostatic pressing in the open container, the heat treatment performed under an inert gas pressure and resulting in gas evolution, and controlling the discharge of said gas evolved by the heat treatment by an exhaust mechanism capable of continuously controlling and exhausting said gas evolved during the hot isostatic pressing such that in said gas evolved, evolution rates for $H_2$ and $CH_4$ each do not exceed 10 mol/hr per 100 grams of said carbonaceous pitch.

2. A process for producing a carbon/carbon composite which process comprises impregnating a tow of carbon filaments with a carbonaceous pitch, placing the impregnated tow in an open container, subjecting the tow to a heat treatment under isostatic pressing in the open container, the heat treatment performed under an inert gas pressure and resulting in gas evolution, and controlling the discharge of said gas evolved by the heat treatment by an exhaust mechanism capable of continuously controlling and exhausting said gas evolved during the hot isostatic pressing such that in said gas evolved, evolution rates for $H_2$ and $CH_4$ each do not exceed 10 mol/hr per 100 gram of said carbonaceous pitch.

3. A process as set forth in claim 1 or 2, wherein said heat treatment is performed at a temperature in the range of 100° C. to 3,000° C. and the inert gas pressure is in the range of 50 to 10,000 kg/cm².

4. A process as set forth in claim 1 or claim 2, wherein under said conditions the evolution rates of $H_2$ and $CH_4$ in evolved gases each do not exceed 5.0 mol/hr per 100 grams of the starting carbonaceous pitch.

5. A process as set forth in claim 2, wherein the volume content of the carbon filaments in the carbon/carbon composites is in the range of 5 to 70%.

6. A process as set forth in claim 1 or 2, wherein said heat treatment is performed in the presence of a member selected from the group consisting of refractory fibers, iron and iron alloys.

7. A process as set forth in claim 1 further comprising carbonizing the carbon material.

8. A process as set forth in claim 1 further comprising graphitizing the carbon material.

9. A process as set forth in claim 2 further comprising carbonizing the carbon/carbon composite.

10. A process as set forth in claim 2 further comprising graphitizing the carbon/carbon composite.

* * * * *

UNITED STATES PATENT AND TRADEMARK OFFICE
CERTIFICATE OF CORRECTION

PATENT NO. : 5,114,635
DATED : May 19, 1992
INVENTOR(S) : Toshinori Nakamura, et al.

It is certified that error appears in the above-identified patent and that said Letters Patent is hereby corrected as shown below:

On the Title page, item [57],

In the Abstract, line 5: "pressing." should read as --pressing, and if necessary, carbonizing or graphitizing the treated product.--

Column 2, line 68, "nd" should read as --and--

Column 4, line 17, "40° C" should read as --400° C--

Column 5, line 27, "kg/c$^2$" should read as --kg/cm$^2$--

Column 8, line 61, "a" should read as --A--

Signed and Sealed this

Twenty-eighth Day of September, 1993

Attest:

BRUCE LEHMAN

*Attesting Officer*    *Commissioner of Patents and Trademarks*